Nov. 20, 1956

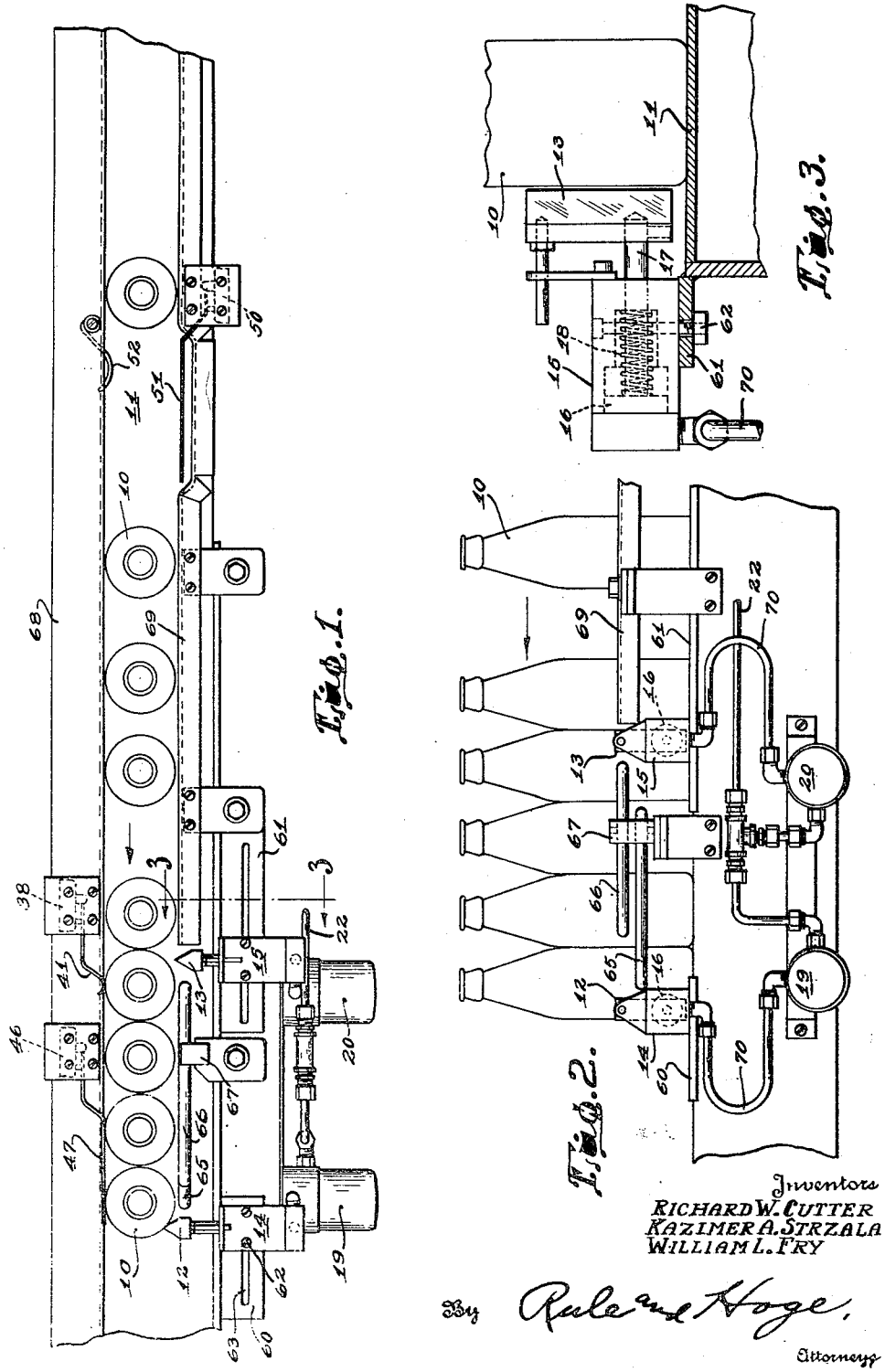

R. W. CUTTER ET AL 2,771,177

ARTICLE GROUPING APPARATUS

Filed July 30, 1953

Inventors
RICHARD W. CUTTER
KAZIMER A. STRZALA
WILLIAM L. FRY

By Rule and Hoge

Attorneys

United States Patent Office 2,771,177
Patented Nov. 20, 1956

2,771,177
ARTICLE GROUPING APPARATUS

Richard W. Cutter, Berkeley, Kazimer A. Strzala, Walnut Creek, and William L. Fry, Lafayette, Calif., assignors to Owens-Illinois Glass Company, a corporation of Ohio Application July 30, 1953, Serial No. 371,308

15 Claims. (Cl. 198—34)

Our invention relates to apparatus for automatically collecting, arranging and segregating articles into individual groups. The invention is adapted for grouping various articles, in general any articles of substantially uniform size or dimensions, including containers such as bottles or jars and numerous other articles.

The invention in its preferred form comprises apparatus by which the articles are transported and guided through a grouping zone in succession. They are arrested in said zone by a forward stop device which projects into the path of the articles, permitting a predetermined number of the articles to accumulate in a row. A hold back stop is then projected between the collected group and the oncoming articles and the forward stop is retracted, permitting the accumulated group to advance as a unit, the operation being then repeated, thus arranging the articles in groups of uniform size and number.

The invention in its preferred form comprises a traveling belt conveyor on which the articles are supported and carried through the grouping zone with the articles spaced at greater or less distances apart on the conveyor. A front or forward stop projecting into the path of the articles arrests the foremost article and the following articles until a group of the desired number has been accumulated. A hold back stop is then projected behind the group to hold back the succeeding articles and at the same time the front stop is retracted permitting the collected group to advance. The articles are thus arranged and grouped in a convenient manner for handling for packing or other operations. The stop devices are electrically controlled and actuated.

Referring to the accompanying drawings:

Fig. 1 is a plan view of an apparatus embodying a preferred form of our invention;

Fig. 2 is a front elevational view of the apparatus;

Fig. 3 is a cross section at the line 3—3 on Fig. 1;

Figure 4:
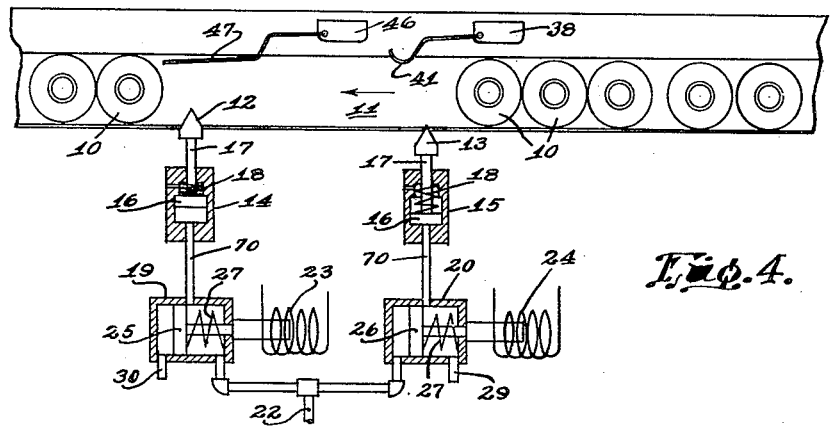
Fig. 4 is a part-sectional plan view, largely diagrammatic, showing the positions of the stop devices and their operating means while the grouping zone is empty.

Referring to Figs. 1 and 2, the apparatus is shown in use for grouping bottles as they are carried along on an endless conveyor, the apparatus being adjusted to accumulate and segregate them into groups of four bottles each. The bottles 10 are carried on a continuously traveling belt conveyor 11 traveling in the direction indicated by the arrows. The front or forward stop 12 is projected horizontally over the conveyor into a stop position to arrest the foremost bottle, each bottle in turn forming a stop for the next succeeding bottle so that they accumulate in a solid row. A hold back stop 13 is then projected behind the accumulated group and the front stop 12 simultaneously withdrawn, permitting the group to advance to a point beyond the front stop. The cycle of operations is then repeated.

The stops 12 and 13 are operated by air motors or cylinders 14 and 15 respectively (Figs. 4 and 5), each comprising a piston 16 and piston rod 17 carrying a stop. The stops are projected by air under pressure admitted behind the pistons and are retracted by coil springs 18. The air supply to the cylinders 14 and 15 is controlled by three-way solenoid valves 19 and 20. Air under pressure is supplied through a pressure pipe line 22 to the valves. Solenoids 23 and 24 actuate the valves.

When the solenoids 23 and 24 are de-energized the valve pistons 25 and 26 are held in the positions shown in Fig. 4 by coil springs 27. Air pressure is then supplied through the valve 19 to the cylinder 14 and holds the front stop 12 in its projected position. At the same time the piston 26 of the valve 20 is held in position to cut off the air supply to the cylinder 15, the latter being opened to the exhaust 29 so that the hold back stop 13 is retracted.

Figure 5:
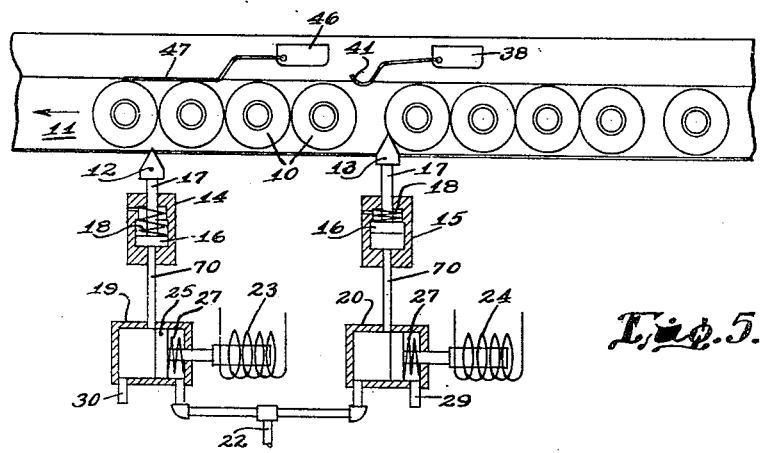
Fig. 5 is a view similar to Fig. 4 but showing the positions of the parts after a group of articles has been assembled and released for continued travel.

Fig. 5 shows the positions of parts when the electromagnets 23 and 24 are energized. The solenoid 23 draws the piston 25 to the right so that the valve is opened to the exhaust 30 and the stop 12 is withdrawn from the path of the bottles. Air pressure at the same time is applied to the cylinder 15 so that the hold back stop 13 is in its projected position. The solenoids 23 and 24 are connected in parallel circuits for simultaneous operation (as hereinafter described) so that when the front or forward stop 12 is projected the hold back stop 13 is retracted (Fig. 4), and when the solenoids are energized the positions of the stops are reversed.

Figure 6:
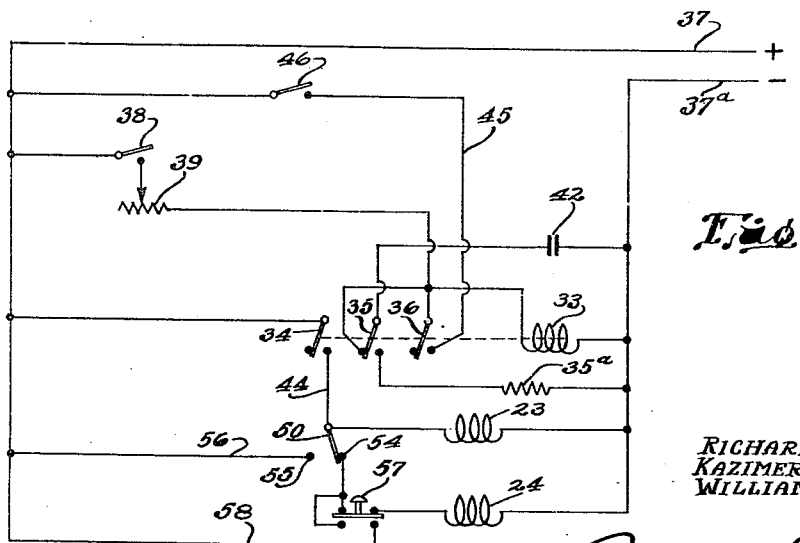
Fig. 6 is a wiring diagram of the electrical apparatus.

Referring to the wiring diagram (Fig. 6), the solenoids 23 and 24 are controlled by a relay comprising a coil 33 and contact bars 34, 35, and 36 actuated thereby. Current is supplied through the mains 37 and 37a. The relay coil 33 is connected in series with a relay switch 38 and a relay time delay throttling resistor 39, the purpose of which will presently be described. A capacitor 42 is connected in a shunt circuit across the relay solenoid 33. The switch 38 is normally open while there are no articles 10 within the grouping zone (Fig. 4). A contact arm or feeler 41 (Fig. 1), connected to the switch 38, projects into the path of the oncoming articles 10 so that each article as it passes the feeler 41 operates to close the relay switch 38. The switch, however, is only momentarily closed by each passing bottle 10 and during this time the line voltage is applied through the high resistance 39 to the capacitor 42. This time is too short to permit sufficient voltage to be built up across the condenser 42 to operate the relay 33. As the relay switch 38 is opened after each passing bottle, the voltage which has been built up across the capacitor or condenser 42 is reduced or eliminated by the bleeding action of the high resistance relay coil 33.

When the complete quota of bottles comprising a group has been accumulated, namely four bottles, the fourth bottle is arrested in position (Fig. 1) to retract the arm 41 and thereby hold the relay switch 38 closed. This permits the voltage across the capacitor to be built up sufficiently for relay coil 33 to operate the relay contact bars 34, 35, and 36. The contact bar 35 connects a high resistance 35a across the capacitor 42 and discharges it. The contact bar 34 completes a circuit through wire 44 to solenoids 23 and 24. The solenoids being thus energized actuate the stops 12 and 13, shifting them from the position shown in Figs. 1 and 4 to the Fig. 5 position. The accumulated group of four bottles is thus released and moves forward with the conveyor while the succeeding bottles are held back by the hold back stop 13. When the forward stop 12 is retracted and the accumulated group of bottles commences its forward travel beyond the Fig. 1 position, the arm 41 is released (Fig. 5) so that the relay switch 38 in the circuit with the relay coil 33 is again opened. However, a holding circuit is maintained for the relay coil, such circuit including the contact bar 36, wire 45, and a relay holding switch 46. The switch 46 is controlled by an arm 47 (Figs. 1, 4, and 5) which projects into the path of the bottles 10. The arm 47 holds the relay switch 46 closed and the relay coil 33 energized until the group of bottles has passed beyond the forward stop 12 as shown in Fig. 4. When the arm 47 is released (Fig. 4) the relay holding switch 46 is again opened so that the relay coil 33 is de-energized and the circuit for the solenoids 23 and 24 is opened. This completes the cycle, leaving the parts in position for the next succeeding grouping operation.

A microswitch 50 (Figs. 1 and 6), herein referred to as an automatic release switch, is mounted on the conveyor frame at a point rearwardly of the grouping zone. The switch comprises an arm 51 extending along the conveyor on one side of the path of the articles 10. A spring contact arm 52 is adjustably mounted on the conveyor frame at a position opposite the arm 51 and protrudes into position to contact the passing articles 10. During normal operation the bottles pass between the arms 51, 52 without operating the switch 50. If a jam occurs, obstructing the forward travel of the bottles past the switch 50, the arm 52 holds a bottle in contact with the arm 51 so that the oncoming bottles force the arm 51 downwardly and operate the switch 50. This opens the circuit for the solenoid 24 at the contact 54 (Fig. 6) and completes a circuit for the solenoid 23 through the switch 50, contact 55 and wire 56, this latter circuit being independent of the relay 33, so that the solenoid 23 is energized and the forward stop 12 accordingly retracted. This provides an open path for the bottles so that they can move freely through the grouping zone. The grouping apparatus remains inoperative until the pressure has been relieved at the switch 50 and the latter permitted to resume its normal inoperative position.

It will be noted that during normal operation the individual groups of bottles are spaced apart a distance at least equal to that between the forward and hold back stops 12 and 13, as the entire group must pass beyond the contact arm 47, leaving the grouping zone empty after each grouping operation before the hold back stop 13 is retracted to permit the entrance of the bottles for the next succeeding group. In practice, the spacing of the bottles approaching the grouping apparatus is sometimes irregular so that at times the bottles may be brought to the grouping zone faster than they can be grouped and spaced. The automatic release switch 50 then operates as above described, permitting an uninterrupted flow through the spacing zone until the pressure on the arm 51 is removed.

A push-button switch 57 (Fig. 6), which serves as an emergency release switch, may be operated at any time to open the circuit for the solenoid 24 independently of the relay 33. The switch 57 operates at the same time to complete a circuit for the solenoid 23 through a wire 58 so that the forward stop 12 is withdrawn the same as when the automatic switch 50 is actuated.

Referring to Figs. 1 to 3, the grouping apparatus comprises adjusting means for accommodating it to articles of different dimensions and also for adjusting it to change the number of articles in a group. For this purpose the air motors 14 and 15 are mounted on and adjustable along plates 60 and 61 and clamped in adjusted position by screw bolts 62 extending through slots 63 in the plates. The stops 12 and 13 may thus be adjusted lengthwise of the conveyor to correspond to the size and number of bottles in a group. Guide rails 65 and 66 are mounted in a bracket 67 and extend lengthwise of the conveyor through the grouping zone. These rails are adjustable lengthwise to correspond to the adjustment of the stops 12 and 13. The air line 22 includes flexible hose connections 70 between the valves 19, 20 and the air motors 14, 15. Additional guiding means or guide rails 68 and 69 extend along the conveyor for guiding and maintaining the bottles in a single row.

Modifications may be resorted to within the scope and spirit of our invention.

We claim:

1. Apparatus for grouping articles including means for conveying the articles in series and guiding them in a predetermined path through a grouping station, a forward stop, means for projecting it into the path of the articles at said station and thereby arresting the forward movement of the articles, a hold back stop positioned back of said forward stop and movable into and out of a projected position in the path of the oncoming articles, and automatic means actuated by the articles at said station for withdrawing the forward stop and concurrently projecting the hold back stop when a predetermined number of the articles have been accumulated at the said station.

2. Apparatus for grouping articles into individual groups, each containing the same number of the articles, said apparatus comprising a horizontally traveling conveyor on which the articles are supported and carried forward through a grouping zone, means for guiding the articles in a single line in a path through said zone, a forward stop at the forward end of said zone, and a hold back stop positioned rearwardly of said forward stop, said stops being mounted at one side of the path of the articles and each movable into and out of the path of the articles, and automatic means activated by the articles at said station for projecting each said stop and simultaneously retracting the other stop.

3. Apparatus for grouping articles comprising a horizontally traveling conveyor by which the articles are conveyed through a grouping zone, means for guiding the articles in a predetermined path and maintaining them in a single line through said zone, stops mounted at one side of the said path including a forward stop and a hold back stop positioned at opposite ends of the said zone, automatic means for projecting the forward stop into the path of the articles and holding it in projected position while the articles forming a group are brought into and accumulated within said zone, automatic means controlled by the accumulated articles at said zone for retracting the forward stop and simultaneously projecting the hold back stop when the quota of articles forming a group has passed the hold back stop, thereby permitting the group to advance beyond the grouping zone, and automatic means to then withdraw the hold back stop and project the forward stop.

4. The apparatus defined in claim 3, the means for projecting and retracting the stops being electro-responsive, and switches actuated by the articles and controlling the operation of the electro-responsive means.

5. Apparatus for grouping articles comprising a horizontally traveling conveyor on which the articles are carried, means for guiding the articles in a predetermined path and maintaining them in a single line as they are advanced by the conveyor, a forward stop and a hold back stop each mounted for movement into and out of said path, the forward stop being spaced in advance of the hold back stop in the direction of travel of the conveyor, motors individual to and operatively connected to said stops and each operable to project and retract its stop, electro-responsive means for controlling and effecting the operation of said motors, said electro-responsive means being operable to cause the motor for the forward stop to project and hold its stop in the path of the articles while the hold back stop is in a retracted position, and to cause the motor for the hold back stop to project the hold back stop and hold it in projected position while the forward stop is held in retracted position, and control means positioned adjacent to said path and operable by the said articles for controlling and causing said operations of said electro-responsive means.

6. Apparatus for grouping articles comprising a horizontally traveling conveyor on which the articles are supported and by which they are carried through a grouping zone, a forward stop and a hold back stop mounted at one side of the path of the articles, piston motors individual to said stops and each operable to project and retract its stop, air valves individual to said piston motors, an air line supplying air pressure through said valves to the air motors, and automatic means for actuating said valves and causing the motor for the forward stop to project and hold the forward stop projected while the hold back stop is in a retracted position and a group of articles is accumulating in the grouping zone, and causing the motor for the hold back stop to project the hold back stop into the path of the articles and hold it in projected position while the forward stop is in retracted position permitting the accumulated group of articles to advance to a position beyond the stops.

7. The combination set forth in claim 6, the said valve actuating means comprising solenoids operatively connected to the valves, switches in circuit with the solenoids and switch operating devices connected to said switches projecting into the path of said articles and operable by the articles to actuate the switches.

8. Apparatus for grouping articles comprising a horizontally traveling conveyor by which articles are carried to and through a grouping zone, means for guiding the articles in a single line in a predetermined path through said zone, a forward stop device and a hold back stop device positioned respectively adjacent to the forward and rear ends of said zone, air motors operatively connected to said stop devices and each operable to project its stop device into said path and retract it to a position out of the path, valves individual to said air motors, solenoids individual to said valves, and automatic means controlled by said articles as they move through said zone for effecting the operation of said solenoids and valves and thereby causing the air motors to project the stops in alternation and hold the forward stop projected and the hold back stop retracted during the accumulation of a group of articles in the grouping zone and then causing the motors to reverse the stops and permit the accumulated group of articles to be carried beyond the grouping zone while the hold back stop is in its projected position.

9. Article grouping apparatus comprising a traveling conveyor on which articles are supported and carried in a predetermined path, a hold back stop mounted for movement into and out of said path, electro-responsive means for effecting the movement of the stop into said path, a normally open switch in circuit with the electro-responsive means and operative when closed to cause operation of said electro-responsive means, a feeler operatively connected to said switch and extending into the path of said articles and operated by each passing article momentarily to close the switch, means for preventing operation of the electro-responsive means during such momentary closing of the switch and permitting operation of the electro-responsive means and movement of the stop into said path when an article is arrested in position to operate said feeler, a forward stop mounted for movement into and out of the said path at a position in advance of said hold back stop, means for holding the forward stop projected into said path while the hold back stop is in its retracted position, and means for automatically retracting the forward stop when the hold back stop is moved into said path.

10. The combination of means for conveying articles in succession along a predetermined path, means for confining the articles within said path, a stop, a feeler projecting into said path and momentarily held in a retracted position by each passing article, means controlled by the feeler for projecting the stop into the path of the articles, means for preventing said projecting of the stop when the feeler is only held momentarily in said retracted position, and article arresting means in advance of said stop for causing accumulation of a group of the articles in position to hold the feeler in retracted position and thereby causing the stop to be projected.

11. Article grouping apparatus comprising a horizontally traveling conveyor by which the articles are carried through a grouping zone, means for guiding the articles in a single line in a path through said zone, stops mounted at one side of said path for projection into and retraction out of said path and including a forward stop and a hold back stop, solenoids individual to said stops, means actuated by said solenoids for controlling the projection and retraction of the stops, a forward switch, a contact arm connected to said switch and extending into the path of the articles adjacent to said forward stop and movable by said articles into position to close the switch, a hold back switch, a feeler connected thereto and projecting into the path of the articles and operable by the passing articles to momentarily close the hold back switch, a relay coil and relay contact bars actuated by said coil, said coil being in circuit with the hold back switch, means for retarding the energization of said coil and operation of the relay when the said hold back switch is momentarily closed by a passing article and permitting operation of the relay when the said feeler is held in its retracted position by one of said articles arrested while in contact with the feeler, another of said relay contact bars being operable to complete a holding circuit through the said forward switch and the relay coil, another of said relay contact bars being movable by the relay to complete a circuit through the two said solenoids.

12. The apparatus defined in claim 11, one said solenoid being operable to retract the forward stop when the solenoid is energized and the other solenoid being operable to project the hold back stop to operative position when the solenoid is energized, said retarding means comprising a resistance in circuit with the hold back switch, and a capacitor connected in parallel with the relay coil.

13. The apparatus defined in claim 11 and in combination therewith an automatic release switch in circuit with the said solenoids, and a switch operating arm operatively connected to said release switch and thereby operative to control the operation of said solenoids.

14. The apparatus defined in claim 11 and in combination therewith an emergency release push-button switch operable to break a circuit through the solenoid for the hold back stop and simultaneously complete a circuit for the forward stop solenoid.

15. Apparatus for grouping articles comprising a traveling conveyor by which articles placed thereon and spaced at intervals along the conveyor are carried forward through and beyond an article grouping zone, forward stop means positioned at the forward end of said zone, hold back stop means at the rear end of said zone, means controlled by the articles on the conveyor for projecting the forward stop means to operative position and for holding the hold back stop means in inoperative position, thereby permitting the articles to be arrested by said forward means and accumulate to form a solid group, and automatic means operable by the accumulated group to retract said forward means to inoperative position and concurrently project the hold back means into position to arrest the articles behind the accumulated group, permitting said group to advance beyond the forward stop means, and automatic means actuated by said group when it has passed the forward stop means to project it to operative position and retract the hold back means to inoperative position, whereby the articles are accumulated in groups and carried forward by the conveyor in groups spaced apart a distance corresponding to the spacing between the forward and hold back stop means.

References Cited in the file of this patent

UNITED STATES PATENTS

| 1,752,540 | Olson | Apr. 1, 1930 |
| 1,872,000 | Keller | Aug. 16, 1932 |
| 1,954,842 | Ranney | Apr. 17, 1934 |